J. H. CULP.
Corn Harvester.
No. 70,816.                    Patented Nov. 12, 1867.
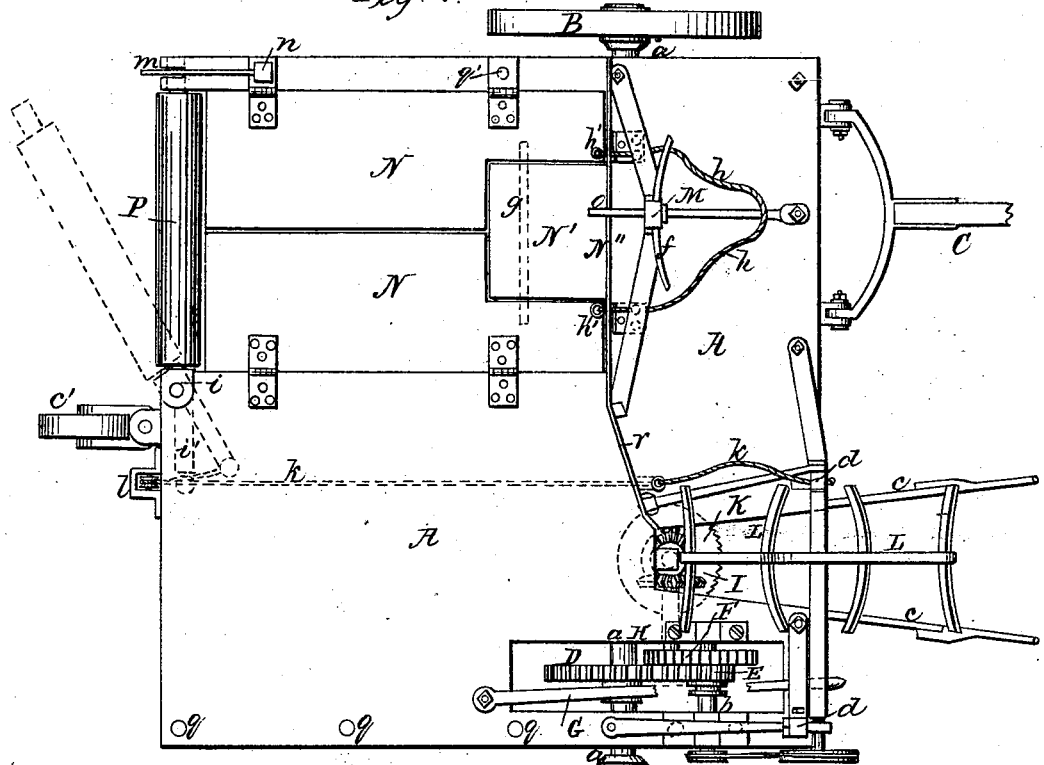
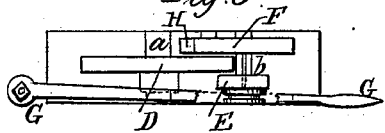
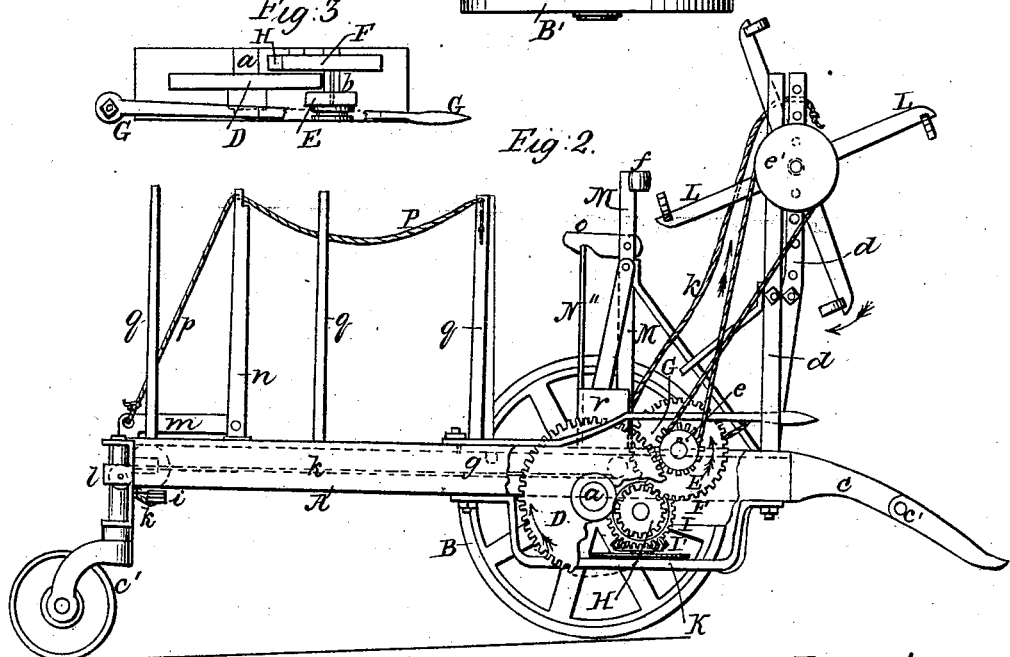
Witnesses
Guy C. Humphries
Chas Herron
Inventor
John H. Culp
by
D. E. Somes & Co.
his Attorneys

United States Patent Office.

JOHN H. CULP, OF QUINCY, OHIO.

Letters Patent No. 70,816, dated November 12, 1867.

IMPROVEMENT IN CORN-HARVESTERS.

The Schedule referred to in these Letters Patent and making part of the same.

TO ALL WHOM IT MAY CONCERN:

Be it known that I, JOHN H. CULP, of Quincy, in the county of Logan, and in the State of Ohio, have invented a new and useful Machine for Cutting and Shocking Corn; and I do hereby declare that the following is a full, clear, and exact description thereof, reference being had to the accompanying drawings, and to the letters of reference marked thereon, in which—

Figure 1 is a plan or top view of my machine,

Figure 2 a side elevation thereof, with a part broken away to show parts that would otherwise be hidden, and Figure 3 shows a part in detail.

The nature of my invention consists in so arranging the parts of my machine that as it is driven through a field of corn the stalks in each hill successively may be cut near the ground, and deposited on the bed of the machine, until enough shall have been gathered to form a shock, say the product of one hundred hills, which is then bound while the machine is halted for the purpose, after which the machine starts again, leaving the shock just formed standing on the butts of its stalks on the ground, to go on cutting and gathering more corn, until there is enough for another shock, when it halts again, and the process of binding and starting and leaving the shock is repeated. The services of two men only are required, one as a driver, and the other to rake and bind.

In the drawings, A A is the bed of the machine, which is composed of a stout frame, covered with a flooring, so as to form a bed or platform, resting on the axle $a$ of the wheels B B'. The wheel B' is fixed on the axle, and gives it rotation. The wheel B is loose, for facility in turning. C is the tongue, to which the team is attached. C' is a caster-wheel, which supports the rear of the machine. Fixed upon the axle $a$ is a spur-wheel, D, which gears into a small spur-wheel, E, fitted on the shaft $b$ of another fixed spur-wheel, F, by a groove and feather, or other equivalent device, so that it may be slid in and out of gear with the spur-wheel D by means of a shipper, G. The two positions are shown in figs. 1 and 3. The spur-wheel F gears into and gives motion to a smaller wheel, H, fixed on the shaft of the bevel-gear I, also fixed, which has its bearings in the under side of the framework of the machine, and is shown in dotted lines in fig. 1. A vertical shaft, driven by the contact of the two bevel-gears I I', carries at its lower end, and near the ground, a circular saw, K, of the requisite degree of fineness, which constitutes the cutter. The bed of the machine has an opening through it, which extends from its front edge backwards to a little distance beyond the vertical shaft of the cutter K, where it is narrower than at the front edge of the machine, and of width sufficient to maintain the stalks, that pass up through, in a vertical position without jamming them. From the front edge of the machine project two arms, $c$ $c$, outwards and downwards in the prolongation of the diverging sides of the opening towards and near the ground, where their front ends are curved like sled-runners to allow them to slide when necessary, and to pass under any stalks that may have fallen down, and lift them up so as to pass between the arms into the opening in the bed of the machine as the cutter approaches. The arms are hinged, as shown at $c'$ $c'$, in order that they may yield to pass over what might otherwise be an obstruction, and the distance between their front ends is sufficient to embrace all the stalks that may grow in a hill, and allow for the lateral irregularities in the motion of the machine that may arise from the inequalities of the ground. Two standards, $d$ $d$, arising from the front end of the machine, one on each side of the arms $c$ $c$, and their prolonged opening, support the journals of the shaft of a reel, L, which has motion imparted to it by a cord or band from the pulley $e$ on the shaft $b$ of the wheel F, to the pulley $e'$ on its own shaft. The direction of the motion is indicated by the arrows. The reel is adjustable vertically, so as to be raised or lowered to suit the height of the corn; and is so set in its relations to the rest of the machinery as that one of its arms shall come in contact with the stalks of a hill at the moment they are severed by the cutter, and throw them on to the bed of the machine. It may be found necessary to use a chain instead of a cord or belt to give motion to the reel, so that it may not slip. From the bed of the machine, near the front, arises a string-standard, M, having a curved cross-bar, $f$, across its top, which constitutes a rest, against which the raker, who stands on the bed of the machine, may lean with his breast, and be supported while he draws, with a rake, the stalks across the machine until they lie on the trap-fall N N N'. These trap-falls cover an opening in the bed of the machine wide enough to allow the passage through it of the stalks that have been collected to make a shock, and extends from the rear of the machine forwards to within a short distance of the rest M ƒ. They are hinged to the bed of the machine, so that when closed they will meet over the centre of the opening, and when let loose will drop so as to hang in the opening, leaving it free and unobstructed. The trap-fall N' is one piece, with, or rigidly attached to, the shield N'', with which it forms a right angle, and is also hinged at this angle to the bed of the machine, so that when the trap N' drops down into the opening, the shield N'' will lie horizontally over it. A bar, g, shown in dotted lines, fig. 1, is attached to the under side of the trap-fall N', and extends a short distance beyond its edges, so that the projecting ends of the bar may be under the edges of the trap-falls N N, and support them in a horizontal position, while the latch O, attached by a joint to the rest M ƒ, holds the shield N'' in a perpendicular position, and prevents the trap N' from yielding to the weight of the traps N N as they rest on the ends of the bar g. A cord, h, is secured by its ends to the trap-falls N N at h' h', and its bight lies on the bed of the machine behind the raker, so that he may, when necessary, use his foot to thrust it back and raise the traps N N to a horizontal position. Across the rear of the opening, covered by the traps, and in line with the rear edge of the bed of the machine, is a roller, P, the spindle or shaft of which is furnished at one end with jaws, by which it is jointed to the bed of the machine at i, so that it may swing horizontally to the extent of a quarter of a circle, or a little more. An arm, i', shown in dotted lines, fig. 1, is attached to and forms part of the lower plate of the jaws, from the end of which arm a cord, k, passing around a pulley, l, at the rear of the machine, extends along beneath it, and, rising around another pulley, seen in dotted lines in fig. 2, passes through a hole in the floor of the machine, and is carried to be secured where it will be within reach of the raker. The other end of the roller-spindle forms a tongue or tenon, which fits into a recess in the end of the side beam of the machine, and permits the roller to be supported at this end by the side beam. A latch, m, is hinged to the standard n near its foot, and detains the roller by catching over the tongue or tenon on the end of the spindle. A cord, p, carried from the latch m, through a hole in the top of the standard n, to within reach of the raker, gives the means of releasing the roller P from detention, so that it may swing outward, as shown in dotted lines, fig. 1, when desirable. Rungs or stanchions q q q keep the stalks from falling off the bed of the machine, or off the traps after they have been deposited. A guide-plate, r, which is supported on edge by standards rising from the bed of the machine, extends from the corner of the opening over the cutter K to the adjacent edge of the shield N'', to prevent the ends of the stalks from catching against it as they are raked on to the traps.

When it is required to transport the machine from one place to another, the shipper G is moved into the position shown in fig. 3, thereby disengaging the wheels D and E, so that the wheels B B' may revolve without putting in motion the rest of the cutting machinery.

The operation of my machine is as follows, viz: The toothed wheels D and E, being in gear, as shown in fig. 1, the trap-falls N N N' covering and closing the opening under them, and the roller P, held by the latch m, as shown in full lines, fig. 1, the machine is started in the field so that the stalks of a row of hills may be ranged with the space between the ends of the arms c c, which embrace and close together the stalks until they are severed by the cutter K, when they will be thrown down on the bed of the machine by the reel L, when they will be immediately raked by the attendant across on to the trap-falls N N N', their butts against and gauged by the shield N'', and their tops resting on and over the roller P. When a sufficient number of stalks have been collected on the trap-falls, say from one hundred hills, the machine halts. The raker lifts the latch O, and the trap-falls N N N' drop, letting the butts of the shock down on to the ground, while the tops are still resting on the roller P, in which position the shock is bound. The raker resumes his place at the rest M ƒ, the machine is started onward, and when the shock has been forced by the roller P to stand on the base formed by its butts, the raker pulls the cord p, disengaging the latch m from the spindle of the roller, which is now swung outward by the resistance of the bound shock, and passes it, leaving it standing on the ground. The raker's foot now raises the traps N N by the cord h. He pulls up the shield N'', bringing the bar g under the traps N N, and secures the traps by the latch O, and then, by a pull on the cord k, brings the roller P across the rear of the opening, where it is held by a latch, m, until another shock is ready to be left standing in the field.

Having thus fully described my invention, what I claim therein as new, and desire to secure by Letters Patent, is—

1. The wheels D E F H I I', the shipper G, cutter K, and reel L, arranged as described, in combination with the sustaining wheels B and shaft a of a corn-cutting machine, as set forth.

2. The jointed arms c c, in combination with the cutter K and reel L, arranged and operating substantially as and for the purpose set forth.

3. The combination of the latch O and the trap-falls N N N' in the bed of a corn-cutting machine, when arranged and operating substantially in the manner and for the purpose described.

4. The roller P, with its arm i' and the latch m, when combined with the frame and bed of a corn-cutting machine, and arranged and operated substantially as and for the purpose set forth.

In testimony that I claim the above-described machine for cutting and shocking corn, I have hereunto signed my name this 4th day of May, 1867.

JOHN H. CULP.

Witnesses:
  G. R. FORSYTH,
  LOUIS CURL.